United States Patent
Swenson et al.

(10) Patent No.: US 8,706,594 B2
(45) Date of Patent: Apr. 22, 2014

(54) BUSINESS METHOD FOR CHARITABLE FUND RAISING

(76) Inventors: Paul Swenson, Sandy, UT (US); Lori L. Oakason, Sandy, UT (US)

( * ) Notice: Subject to any disclaimer, the term of this patent is extended or adjusted under 35 U.S.C. 154(b) by 1950 days.

(21) Appl. No.: 10/786,706

(22) Filed: Feb. 25, 2004

(65) Prior Publication Data

US 2005/0177462 A1 Aug. 11, 2005

Related U.S. Application Data

(60) Provisional application No. 60/543,063, filed on Feb. 6, 2004.

(51) Int. Cl.
*G06Q 40/00* (2012.01)

(52) U.S. Cl.
USPC .......................... 705/36 T; 705/35

(58) Field of Classification Search
USPC ........................ 705/35, 36 R, 36 T
See application file for complete search history.

(56) References Cited

U.S. PATENT DOCUMENTS

| | | | |
|---|---|---|---|
| 2002/0116215 A1* | 8/2002 | Lawrence et al. ................ | 705/1 |
| 2002/0156787 A1 | 10/2002 | Jameson et al. | |
| 2003/0014300 A1 | 1/2003 | Franco et al. | |
| 2003/0046134 A1 | 3/2003 | Frolick et al. | |
| 2003/0126073 A1* | 7/2003 | Lawrence ....................... | 705/38 |
| 2003/0195766 A1* | 10/2003 | Abramson ...................... | 705/1 |
| 2004/0133489 A1* | 7/2004 | Stremler et al. ................. | 705/35 |
| 2004/0181468 A1* | 9/2004 | Harmon et al. ................. | 705/29 |
| 2005/0055264 A1 | 3/2005 | Gallick et al. | |

OTHER PUBLICATIONS

Fundraising.com <URL: http://www.fundraising.com> [online], 1990-2003 [retrieved on Sep. 12, 2007]. Retrieved from the Internet: <URL: http://www.archive.org>.*
Proquest, Milwaukee Journal Sentinel; Journal Sentinel Abstract (Summary) [online], Apr. 2000 [retrieved on Sep. 12, 2007]. Retrieved from the Internet: <URL: http://www.proquest.com>.*
Webster's II New Riverside University Dictionary Webster 1996. p. 483.*
Freedom Field <URL: http://www.bright.net> [online], Mar. 2001 [retrieved on Apr. 11, 2005]. Retrieved from the Internet: 0 <URL: http://www.archive.org>.*
Healing Field <URL: http://www.healingfield.org> [online], Sep. 2002 [retrieved on Apr. 11, 2005]. Retrieved from the Internet:<URL: http://www.archive.org>.*
Perpetual Fundraising System <URL: http://www.colonialflag.com> [online], May 2001 [retrieved on Apr. 11, 2005]. Retrieved from the Internet:<URL: http://www.archive.org>.*

(Continued)

*Primary Examiner* — Justin M Pats
*Assistant Examiner* — Benjamin S Fields
(74) *Attorney, Agent, or Firm* — Thorpe North & Western LLP

(57) ABSTRACT

The invention provides a method for charitable fund raising. The method can include the initial operation of identifying a charitable cause in need of funding. A further operation is providing a plurality of flags to be displayed as a healing field. The display of the healing field can be linked to the charitable cause in need of funding. The healing field can also be displayed as part of a public awareness campaign. Finally, the flags that are displayed in the healing field can be sold, with the profits from the sale going to the charitable cause in need of funding.

18 Claims, 1 Drawing Sheet

(56) References Cited

OTHER PUBLICATIONS

Freedom Field <URL: http://www.bright.net> [online], Mar. 2001 [retrieved on Apr. 11, 2005]. Retrieved from the Internet: <URL: http://www.archive.org>.*

Healing Field <URL: http://www.healingfield.org> [online], Sep. 2002 [retrieved on Apr. 11, 2005]. Retrieved from the Internet: <URL: http://www.archive.org>.*

Perpetual Fundraising System <URL: http://www.colonialflag.com> [online], May 2001 [retrieved on Apr. 11, 2005]. Retrieved from the Internet: <URL: http://www.archive.org>.*

Colonialflag.com web pages May 2001, Retrieved from Archive.org Nov. 4, 2005.

Oakason, Lori "fields of flags" Exchange Today, Nov./Dec. 2002.

Cmarket.com Web Pages, Feb. 2003, Retrieved from Archive.org Nov. 4, 2005.

Bright.net Web Pages "Freedom filed" Mar. 2001, Retrieved from Archive.org Nov. 4, 2005.

Committeeonline.com Web Pages, Jan. 2003, Retrieved form Archive.org Nov. 4, 2005.

Pyron, Tim Special edition using Microsoft project 2002, ISBN 0-7897-2701-3, Chapters 2, 3, 7, and 14-15.

* cited by examiner

BUSINESS METHOD FOR CHARITABLE FUND RAISING

Priority of application No. 60/543,063 filed Feb. 6, 2004, in the United States Patent Office is hereby claimed.

FIELD OF THE INVENTION

The present invention relates generally to the field of business method patents. More particularly, the present invention relates to methods for charitable fundraising.

BACKGROUND

Charitable organizations fill an important niche in society, allowing people to help take care of the sick, the poor and the needy, as well as advancing medicine, science and public welfare. Without the work of charitable organizations, the government would be forced to spend much more time, money, and energy on public welfare causes. In order for charitable organizations to exist, there has to be a method for obtaining funding. Often, a large portion of a charitable group's work involves fundraising.

Raising money in the public and corporate sectors requires advertising to make the charitable organization and its cause known to the public. Advertising is often an expensive and time consuming ordeal. One of the most successful methods used to advertise is through telemarketing. However, telemarketing is still somewhat inefficient and can be impersonal. Members of the public must be contacted individually over the phone, often at inconvenient times. Further, telemarketing has become so burdensome to the public that laws have recently been enacted prohibiting most telemarketers from calling people that have signed on to a national 'Do Not Call List.' The list limits the effectiveness of telemarketing.

One of the keys to successful fundraising is to limit the percentage of overhead required to raise the funds. While it may be possible to raise funds by throwing an elaborate gala with dinner and entertainment, such extravagance may leave few funds left for the charitable organization after the bills for the gala are paid. Even basic fundraising methods such as telemarketing, as previously discussed, can require a large percentage of the overall contributions to be re-invested to pay for the fundraising.

SUMMARY OF THE INVENTION

The invention provides a method for charitable fund raising. The method can include the initial operation of identifying a charitable cause in need of funding. A further operation is providing a plurality of flags to be displayed as a healing field. The display of the healing field can be linked to the charitable cause in need of funding. The healing field can also be displayed as part of a public awareness campaign. Finally, the flags that are displayed in the healing field can be sold, with the profits from the sale going to the charitable cause in need of funding.

Additional features and advantages of the invention will be apparent from the detailed description which follows, taken in conjunction with the accompanying drawings, which together illustrate, by way of example, features of the invention.

DETAILED DESCRIPTION

Figure 1:
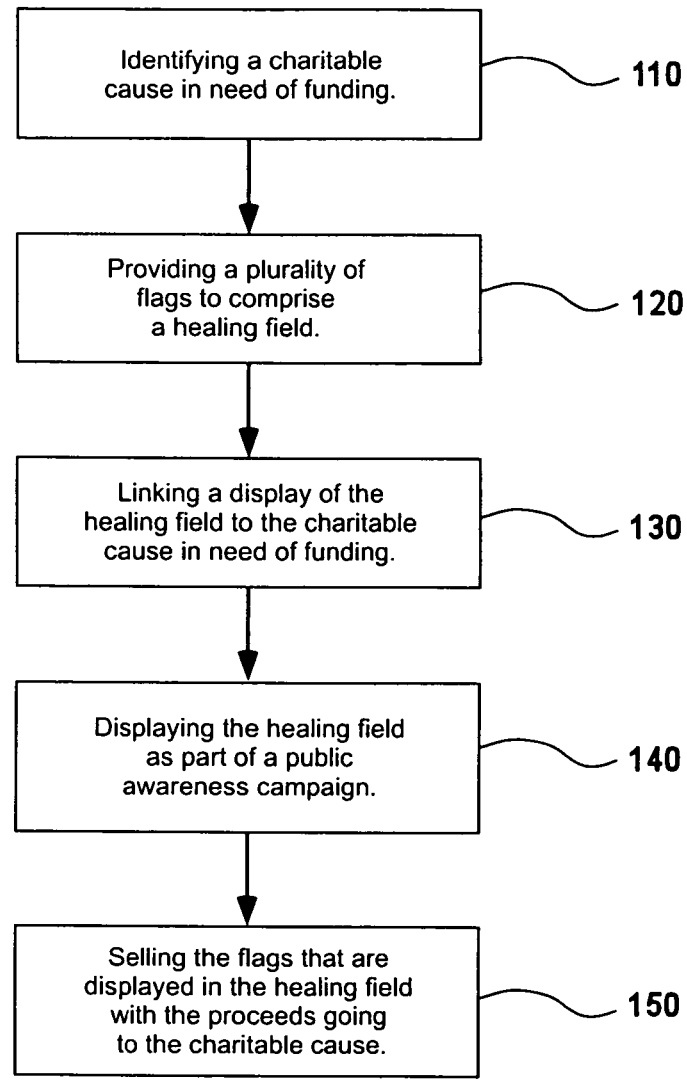
FIG. 1 is a flow chart depicting a business method for charitable fund raising.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Charitable organizations have attempted to overcome the problems associated with fundraising using a variety of methods. One commonly used method involves distributing paraphernalia imprinted with the name or logo of a charitable organization. While this method can keep overhead costs low, merely placing a charitable organization's logo in a public place does not necessarily educate the public about the charitable organization or encourage the public to donate funds. What is needed is a method for raising funds for a charitable organization that can reduce overhead, increase public awareness of the charitable organization and raise a substantial amount of the funds needed by the charitable organization.

In order to overcome the problems described and to provide a business method for charitable fundraising that can reduce overhead while increasing public awareness of the charitable organization and raise substantial funds, the present invention provides a business method for charitable fundraising, as illustrated in FIG. 1. The method includes step 110, which involves identifying a charitable cause in need of funding.

A further operation is providing a plurality of flags representing a "healing field", as shown in step 120. A healing field comprises an array of flags that can be associated with a historical event, typically including an emotional aspect sensitive to a group or public sector. A historical event can be any event which has occurred in the past which establishes a memory associated with the historical event and whose value extends into a large group of people, such as a church congregation, a community, a city, a state, a nation, and so forth. Historical events can include historical events relating to soldiers, policemen, firemen, and other people that are giving life service. Historical events may also include events relating to historical figures such as Abraham Lincoln and Martin Luther King, and events relating to historical occurrences such as D-day, Pearl Harbor, and the September $11^{th}$ attacks. Historical events may include the impact of diseases. For example, historical events may include the impact of deaths caused by diseases such as cancer or degenerative diseases. Historical events may also include events such as child abuse or spousal abuse, wherein each flag in a healing field may represent someone who has been a victim of abuse. A healing field that is an array of flags can invoke people's sympathies and memories concerning the historical event that the healing field represents.

A further operation involves linking a display of the healing field to the charitable cause in need of funding, as shown in step 130. This step may occur before, during, and after step 140 discussed below. Linking a display of the healing field to the charitable cause can involve educating the public about the charitable cause and how the healing field relates to that charitable cause. For example, a bank may sponsor a healing field representing a historical event, such as child abuse. People entering the bank may see advertisements in the bank concerning child abuse, with a plea to donate to the cause by sponsoring a flag that will appear in the healing field. Over time, tens to tens of thousands of sponsors may sign up to sponsor a flag, depending on the charitable cause, the size of the campaign, and other factors. The sponsors may then educate their friends, neighbors, and family on the charitable cause and its association to the healing field. The healing field may also be linked to the charitable cause by educating people through other forms of media such as radio, television, posters and signs in businesses, churches, clubs, public places, and any other form of communication that can educate the public. Sponsors may even go door to door, educating people and businesses about the field of flags and what it represents. Sponsorship of flags in the healing field is not limited to individuals. Churches, clubs, organizations, businesses, and corporations can sponsor single flags or groups of flags. For example, a large corporation may wish to purchase sponsorship of 1000 flags in a healing field. A small business may decide to purchase sponsorship of 50 flags.

In another embodiment, an entity may purchase all of the flags necessary to create a healing field. The entity may then recoup the cost of the sponsorship by selling the flags after the healing field has been displayed, as discussed below. For example, a bank may purchase the flags for a healing field and display the field to represent the historical fight against muscular dystrophy. Either the bank or the muscular dystrophy charity may design the graphic layout of the field of flags in the healing field to correlate to a graphic figure relating to the charity.

Once the flags have been purchased through public or private donations, including sponsorships, a further operation includes displaying the healing field as part of a public awareness campaign, as shown in step 140. The healing field can be displayed in a public or private location where the public may view the flags. The healing field can be an array of tens of flags to tens of thousands of flags. The healing field may be placed in a location that coincides with the charitable cause, or it may be placed in a public park, around a public or private building, along a lake, a river, a path, or any other location that would allow the public to view the healing field. The healing field should be arranged in a geometric pattern that can catch the eye of the public.

Selection of a graphic layout is important because the graphic image helps to stimulate the desired emotional response from the viewing public. For example, a large array in columns and rows creates an atmosphere of reverence, eliciting a spirit of respect and admiration. The healing field may also be placed in a linear array. The linear array can be an array of flags placed either in single file or several deep. The linear array can be placed along a path, a lake, a river, a building, a road, a highway, a trail, a hill, a mountain, or a military base.

The display of flags can also encourage the public to become more familiar with the charitable cause that relates to the healing field. The display may include signs explaining the purpose of the healing field, and the charitable cause it represents. Advertisements explaining the purpose of the healing field may also be produced through other forms of print and audio-visual media. The display of the healing field, together with advertisements explaining the purpose of the healing field, can educate the public about the historical event and encourage them to donate to the charitable cause that is in need of funding.

The method further includes step 150, which involves selling the flags that are displayed in the healing field and donating the proceeds to the charitable cause in need of funding. This step can take place once the healing field has been displayed for an appropriate amount of time to allow the public to become familiar with the historical purpose behind the healing field. The flags may be sold through another advertising campaign. The advertising campaign to sell the flags may comprise print ads and/or audiovisual advertisements in newspapers and magazines, and on the radio and television, and through the use of the news and media. The advertising campaign may also include the use of the internet to raise public awareness of the healing field and the sale of the flags in the field to benefit the charitable cause. Alternatively, the flags in the healing field may be sold in an auction. The auction may be a physical auction, or it may be an internet auction, such as placing the flags for sale on EBay®.

As mentioned above, flags are often used to commemorate emotional events because they promote an emotional response in people. The emotional response provoked by the healing field can be used to increase the value of the flags used to create the field, thus increasing the profits that can be donated to the charitable cause. The present invention therefore provides a method for raising funds for a charitable organization that can reduce overhead, increase public awareness of the charitable organization, and raise a substantial amount of the funds needed by the charitable organization.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for raising funds for a charitable cause comprising the steps of:
   identifying a charitable cause in need of funding;
   obtaining one or more sponsors to fund the charitable cause through paying for a plurality of flags prior to their display, with at least a portion of the funds being donated to the charitable cause;
   transforming a selected location by erecting the plurality of flags at the selected location to comprise a healing field that is, at least in part, expressive of the charitable cause;
   linking a display of the healing field to the charitable cause in need of funding by carrying out a public awareness campaign designed to educate others about the charitable cause and its relation to the healing field;
   displaying the healing field as part of the public awareness campaign, the plurality of flags being positioned in a predetermined pattern;
   selling at least some of the plurality of flags that are displayed in the healing field to raise additional funds for the charitable cause in need of funding; and
   removing the plurality of flags after a predetermined display period to eliminate the healing field from the location.

2. A method as in claim 1, wherein the step of providing a plurality of flags to comprise a healing field further comprises the step of identifying a historical event to be symbolized by the plurality of flags.

3. A method as in claim 1, wherein the predetermined pattern is a geometric pattern.

4. A method as in claim 1, wherein the predetermined pattern is a linear array placed along an area selected from the group consisting of a path, a body of water, a river, a building, a structure, a road, a highway, a trail, a hill, a mountain, and a military base.

5. A method as in claim 1, further comprising the step of incorporating information within the predetermined pattern.

6. A method as in claim 1, further comprising the step of incorporating a graphic message within the predetermined pattern.

7. A method as in claim 1, wherein the step of linking a display of the healing field to the charitable cause further comprises the step of advertising a purpose for the plurality of flags and the healing field, wherein the purpose links the plurality of flags and the healing field to the charitable cause.

8. A method as in claim 7, wherein the step of advertising the purpose for the plurality of flags and the healing field further comprises the step of advertising through a medium selected from the group consisting of radio stations, television stations, newspapers, magazines, and internet sites.

9. A method as in claim 1, wherein obtaining one or more sponsors further comprises obtaining one or more sponsors, wherein each sponsor is a person that pays to sponsor one or more flags in the plurality of flags.

10. A method as in claim 1, wherein obtaining one or more sponsors further comprises obtaining one or more sponsors, wherein each sponsor is an organization that pays to sponsor one or more flags in the plurality of flags.

11. A method as in claim 1, wherein the step of selling the plurality of flags further comprises the step of selling the plurality of flags through an auction.

12. A method as in claim 11, wherein the auction is an internet auction.

13. A method as in claim 1, wherein the step of selling the plurality of flags further comprises the step of selling the plurality of flags through an advertising campaign.

14. A method as in claim 1, wherein the step of selling the plurality of flags further comprises the step of placing advertisements near the healing field.

15. A method as in claim 1, wherein the step of selling the plurality of flags further comprises the step of advertising through a medium selected from the group consisting of radio stations, television stations, newspapers, magazines, and internet sites.

16. A method as in claim 15, wherein the step of advertising through the medium of magazines further comprises the step of advertising through magazines that are substantially specific to a purpose for the healing field.

17. The method of claim 1, further comprising repeating the steps of identifying a charitable cause, providing a plurality of flags, linking a display of the healing field, displaying the healing field, coordinating the viewing of the healing field, selling the plurality of flags, and removing the plurality of flags, for a different charitable cause at a different location.

18. A method for raising funds for a charitable cause comprising the steps of:
   identifying a charitable cause in need of funding;
   obtaining one or more sponsors to fund the charitable cause by paying for a plurality of flags prior to their display;
   providing the plurality of flags to comprise a healing field that is, at least in part, expressive of the charitable cause;
   linking a display of the healing field to the charitable cause in need of funding by carrying out a public awareness campaign designed to educate others;
   displaying the healing field as part of the public awareness campaign, the plurality of flags being positioned in a predetermined pattern, the plurality of flags temporarily occupying a location not dedicated to providing a permanent display of the flags;
   selling at least some of the plurality of flags that are displayed in the healing field and donating at least a portion of proceeds to the charitable cause in need of funding; and
   removing the plurality of flags to eliminate the healing field from the location.

* * * * *